(12) United States Patent
Hong et al.

(10) Patent No.: US 8,793,734 B2
(45) Date of Patent: Jul. 29, 2014

(54) METHOD AND APPARATUS FOR PROVIDING FILTERING INTERFACE FOR RECORDING AND/OR SEARCHING FOR BROADCAST CONTENT

(75) Inventors: Kyung-wha Hong, Seoul (KR); Sung-ho Ryu, Suwong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1376 days.

(21) Appl. No.: 11/652,100

(22) Filed: Jan. 11, 2007

(65) Prior Publication Data
US 2007/0186244 A1    Aug. 9, 2007

(30) Foreign Application Priority Data

Feb. 7, 2006  (KR) .................. 10-2006-0011820

(51) Int. Cl.
H04N 5/445   (2011.01)
G06F 13/00   (2006.01)
G06F 3/00    (2006.01)

(52) U.S. Cl.
USPC ............................................. 725/46; 725/45

(58) Field of Classification Search
USPC ......... 725/46, 34, 35, 45, 131, 133, 141, 139, 725/151, 153, 100; 707/3
See application file for complete search history.

(56) References Cited

U.S. PATENT DOCUMENTS

| | | | |
|---|---|---|---|
| 5,872,865 A * | 2/1999 | Normile et al. ............... 382/224 |
| 6,901,559 B1 * | 5/2005 | Blum et al. ................... 715/811 |
| 7,055,168 B1 * | 5/2006 | Errico et al. ................... 725/46 |
| 7,277,894 B2 * | 10/2007 | Kondo et al. ................... 1/1 |
| 7,287,218 B1 * | 10/2007 | Knotz et al. ................... 715/209 |
| 7,568,209 B1 * | 7/2009 | Addington et al. ............. 725/32 |
| 2002/0087979 A1 * | 7/2002 | Dudkiewicz et al. ........... 725/34 |
| 2002/0169764 A1 * | 11/2002 | Kincaid et al. ................... 707/3 |
| 2002/0174430 A1 * | 11/2002 | Ellis et al. ....................... 725/46 |
| 2003/0018652 A1 * | 1/2003 | Heckerman et al. ........ 707/104.1 |
| 2004/0039579 A1 * | 2/2004 | Chithambaram et al. ......... 705/1 |
| 2004/0122656 A1 * | 6/2004 | Abir ................................... 704/4 |
| 2004/0210932 A1 * | 10/2004 | Mori et al. ....................... 725/39 |
| 2005/0267994 A1 * | 12/2005 | Wong et al. .................... 709/246 |

FOREIGN PATENT DOCUMENTS

| | | | |
|---|---|---|---|
| CN | 1381133 A | 11/2002 | |
| JP | 2001-160940 A | 6/2001 | |
| JP | 2003-256309 A | 9/2003 | |
| JP | 2004-193960 A | 7/2004 | |
| KR | 10-0312172 B1 | 10/2001 | |
| KR | 10-2004-0102961 A | 12/2004 | |
| WO | WO 2005/048601 A1 * | 5/2005 | ............... H04N 7/16 |

* cited by examiner

Primary Examiner — Hunter B Lonsberry
(74) Attorney, Agent, or Firm — Sughrue Mion, PLLC

(57) ABSTRACT

A method and an apparatus for providing a filtering interface that records and searches for broadcasting content is provided. A method for providing a filtering interface that records and searches for broadcasting content according to exemplary embodiments of the present invention includes analyzing user preferences for each property of the broadcasting content according to play history information of the recorded broadcasting content, generating a properties list by clustering the properties based on the user preferences, receiving a predetermined property from the properties list, extracting broadcasting content that correspond to the received properties from currently-aired or soon-to-be-aired broadcasting content, and providing a list of the extracted content.

20 Claims, 8 Drawing Sheets

FIG. 4

| MAIN GENRES | |
|---|---|
| PREFERENCE | MAIN GENRES |
| OOOO | EDUCATION |
| OOOO | ENTERTAINMENT |
| OOOO | DRAMA |
| OOOO | ISSUES/ DOCUMENTARIES |
| OOO | NEWS |
| OOO | CULTURE/ INFORMATION |
| OOO | CARTOONS |
| OOO | MOVIES |
| OOO | INTERNATIONAL SATELLITE |
| OOO | INFOMERCIALS |

| SUBORDINATE GENRES | |
|---|---|
| PREFERENCE | SUBORDINATE GENRES |
| OOOO | INFANTS |
| OOO | OTHER/FOREIGN LANGUAGES |
| OOO | UNIVERSITY/CYBER COLLEGE |
| OOO | GERMAN |
| OOO | JAPANESE |
| OOO | CHINESE |
| OOO | FRENCH |
| OO | ELEMENTARY EDUCATION |
| OO | JUNIOR HIGHSCHOOL EDUCATION |
| OO | HIGH SCHOOL EDUCATION |

| SUBORDINATE GENRES | |
|---|---|
| PREFERENCE | SUBORDINATE GENRES |
| OOOO | SOCIETY |
| OOOO | LIFE/HUMAN |
| OOO | MOVIES |
| OOO | ART |
| OOO | ENVIRONMENTAL ISSUES |
| OOO | CULTURE |
| OOO | INDUSTRY |
| OOO | SCIENCE |
| OO | ANIMALS |
| OO | NATURE/TRAVEL |

METHOD AND APPARATUS FOR PROVIDING FILTERING INTERFACE FOR RECORDING AND/OR SEARCHING FOR BROADCAST CONTENT

CROSS-REFERENCE TO RELATED APPLICATION

This application is based on and claims priority from Korean Patent Application No. 10-2006-0011820 filed on Feb. 7, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to providing a filtering interface, more particular, to providing a filtering interface that easily searches and selects broadcasting content.

2. Description of the Related Art

In line with widespread distribution of digital broadcasting services, the number of available broadcasting content is increasing. Viewers, on the other hand, have limited time to watch TV programs. Accordingly, in order for the viewers to watch TV programs independent of air time, the distribution of a filtering-interface provision apparatus 200 such as personal video recorder (PVR), which can record TV programs, is increasing.

According to the prior art, a filtering-interface provision apparatus 200 receives information on a TV program to record from a user, and records a program corresponding to the information.

Scheduling "timer record" for a TV program using the filtering-interface provision apparatus 200 according to the prior art requires multiple steps of manual manipulations. For example, when recording a sports program to watch a specific player, a user selects a genre first, and "sports", and then inputs the name of the player as a keyword.

Because a conventional filtering-interface provision apparatus 200 lists properties information, a viewer needs to go through multiple manipulation steps in order to select a property among others and this is inconvenient for the viewer. In addition, the fact that a keyword is input by using a limited control means such as a remote controller only adds more inconvenience.

Many inventions (e.g. Japanese Unexamined Publication No. 2003-256309, "Electronic Information Content Distribution Processing System, Information Distribution Apparatus, Information Processing Apparatus, and Information Processing Method") have been proposed but none of which has solutions to the aforementioned problem.

SUMMARY OF THE INVENTION

In view of the above, it is an aspect of the present invention to provide a method and an apparatus for providing a filtering interface can easily searches for and selects broadcasting content.

This and other aspects of the present invention will become clear to those skilled in the art upon review of the following description, attached drawings and appended claims.

According to an aspect of the present invention, there is provided a method for providing a filtering interface that records and searches for broadcasting content comprising analyzing user preferences for each property of the broadcasting content according to play history information of the recorded broadcasting content; generating a properties list by clustering the properties based on the user preferences; receiving a predetermined property from the properties list; extracting broadcasting content that correspond to the received properties from currently-aired or soon-to-be-aired broadcasting content; and providing a list of the extracted content.

According to another aspect of the present invention, there is provided an apparatus for providing a filtering interface that records and searches for broadcasting content comprising a preference-analysis module that analyzes user preferences for each property of the broadcasting content according to play history information of the recorded broadcasting content; a properties-list generation module that generates a properties list by clustering the properties based on the user preferences; a user-input module that receives a predetermined property from the properties list; a filtering module that extracts broadcasting content that correspond to the received properties from currently-aired or soon-to-be-aired broadcasting content; and a filtering-interface module that provides a list of the extracted content.

BRIEF DESCRIPTION OF THE DRAWINGS

The above and other features and advantages of the present invention will become more apparent by describing in detail exemplary embodiments thereof with reference to the attached drawings in which:

FIG. 4 illustrates properties arranged according to a user preference according to an exemplary embodiment of the present invention;

DETAILED DESCRIPTION OF THE INVENTION

Figure 1:
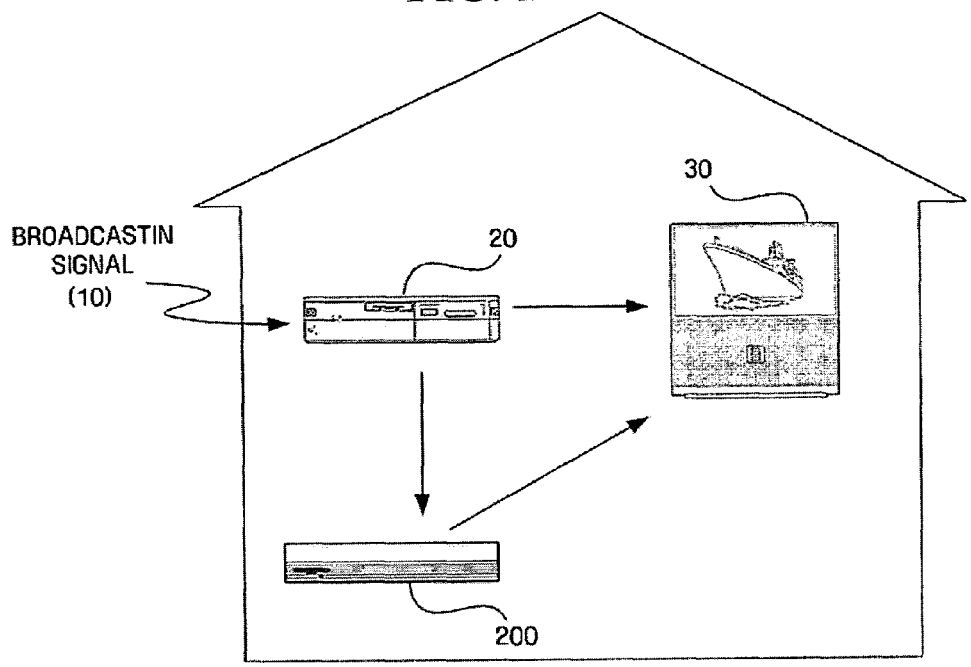
FIG. 1 illustrates a filtering interface-providing system that can apply to the present invention.

Exemplary embodiments of the present invention will be described in detail with reference to the accompanying drawings.

Aspects of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 illustrates a filtering interface-providing system that can apply to the present invention.

The filtering interface-providing system includes a broadcasting receiver 20, a broadcasting output device 30, and a filtering-interface provision apparatus 200.

The broadcasting receiver 20 receives a broadcasting signal 10 from TV stations, and restores broadcasting content from the received broadcasting signal. Here, the broadcasting signal 10 may be transmitted via at least one of terrestrial broadcasting, satellite broadcasting, cable broadcasting, or Internet broadcasting.

Moreover, the TV broadcasting receiver may extract additional information such as electronic program guide (EPG) from the broadcasting signal 10. The additional information may include details of the broadcasting content such as genres, channels, titles, air times, and episode numbers. Such the broadcasting receiver 20 may be implemented as a step box, or a TV receiving card that is attached to a personal computer.

The broadcasting output device 30 outputs broadcasting content restored by the broadcasting receiver 20 or recorded by the filtering-interface provision apparatus 200 to a user. In order to do such operations, the broadcasting output device 30 may include speakers that output audio signals, and a display module that outputs video signals. The broadcasting output device may be implemented in a digital TV, a projector, or a monitor.

The filtering-interface provision apparatus 200 provides a filtering interface 600 that includes properties list arranged in accordance with the user preference so that the user can easily search for broadcasting content to record. In addition, the filtering-interface provision apparatus 200 records the broadcasting content restored by the broadcasting receiver 20. The filtering-interface provision apparatus 200 may receive additional information as well as the broadcasting content from the broadcasting receiver 20. A PVR and a PC having a built-in TV receiver card may be used as a filtering-interface provision apparatus 200. The detailed descriptions thereon will be described later with reference to FIGS. 2A to 2C.

In exemplary embodiments of the present invention, the broadcasting receiver 20, the broadcasting output device, and the filtering-interface provision apparatus 200 are illustrated as a single device; however, these exemplary embodiments are illustrative. That is, two or more of the broadcasting receiver 20, the broadcasting output device, and the filtering-interface provision apparatus 200 may be integratedly implemented in a single device.

Next, a filtering-interface provision apparatus 200 according to an exemplary embodiment of the present invention will be described with reference to FIGS. 2A to 6.

Figure 2A:
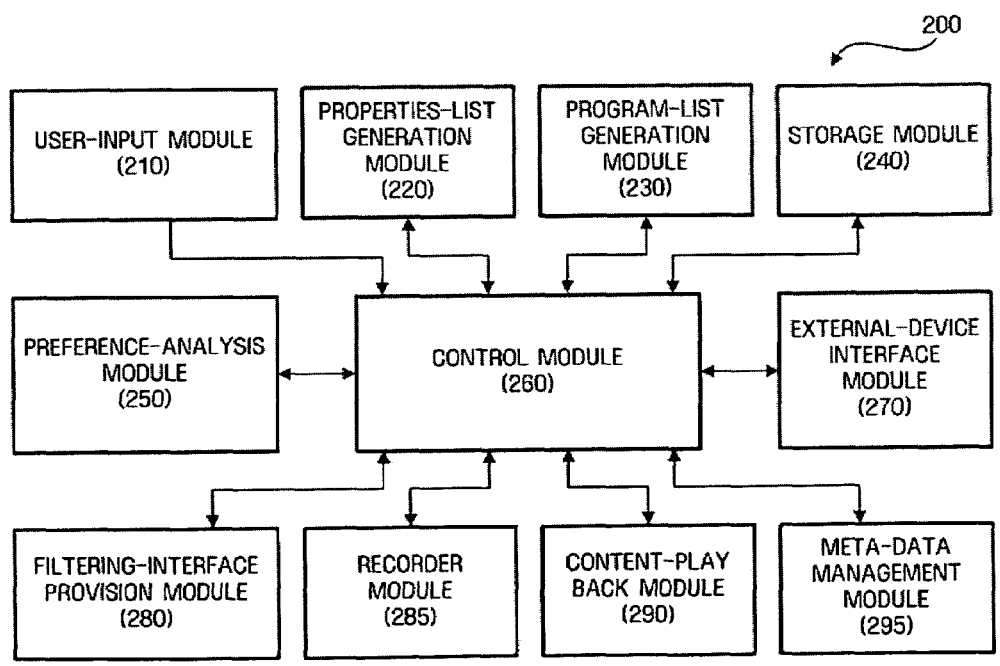
FIG. 2A illustrates a configuration of a filtering-interface provision apparatus 200 according to an exemplary embodiment of the present invention.
Figure 2B:
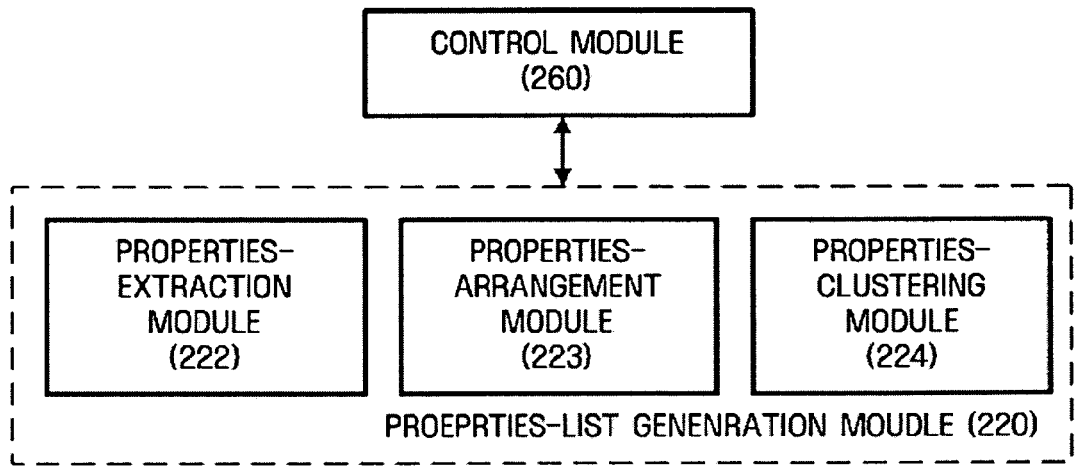
FIG. 2B is a block diagram illustrating a properties list-generation module illustrated in FIG. 2A in detail.
Figure 2C:
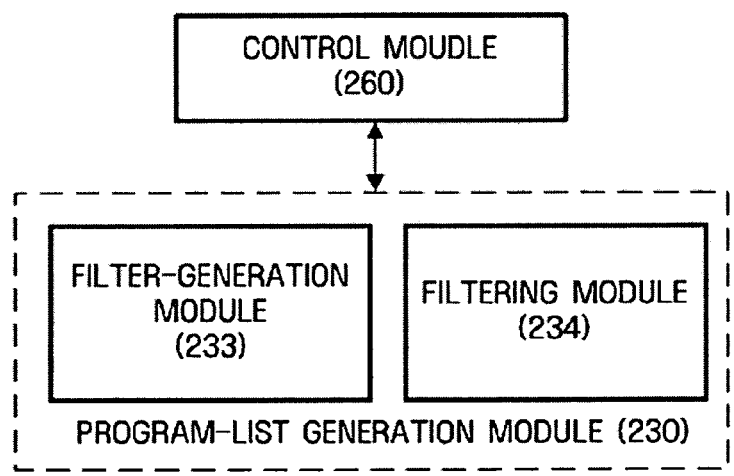
FIG. 2C is a block diagram illustrating a program-generation module illustrated in FIG. 2A in detail.

Here, FIG. 2A is a block diagram illustrating a filtering-interface provision apparatus 200 according to the exemplary embodiment of the present invention, FIG. 2B is a block diagram illustrating a properties list-generation module illustrated in FIG. 2A in detail, FIG. 2C is a block diagram illustrating a program-generation module illustrated in FIG. 2A in detail.

The filtering-interface provision apparatus 200 includes a user-input module 210, a preference-analysis module 250, a properties-list generation module 220, a program-list generation module 230, a filtering-interface provision module 280, a recorder module 285, a content-playback module 290, a meta-data management module 295, an external-device interface module 270, a storage module 240, and a control module 260.

The recorder module 285 records the broadcasting content restored by the broadcasting receiver 20. In order to perform such an operation, the recorder module 285 may include storage media such as a hard disk or a flash memory. The broadcasting recorded by the recorder module 285 may be compressed by a predetermined video coding method such as MPEG-2 and MPEG-4.

The content-playback module 290 plays the broadcasting content recorded by the recorder module 285. The content-playback module 290 may be implemented according to a video decompression method that corresponds to the video compression method used by the recorder module 285 in order to play the content. The content-playback module 290, while playing back the broadcasting content, checks for the most recently played position via play history information included in meta-data of the broadcasting content to play, and can play the broadcasting content from that position.

The user-input module 210 receives a control command from the user. In order to perform such an operation, the user-input module 210 may include an input means such as a keypad or a touch screen. The user-input module 210 may include an infrared receiver in order to receive the user control command from a remote controller (now shown).

The external-device interface module 270 communicates with the broadcasting receiver 20 and the broadcasting output device 30 using wired or wireless medium. More particularly, the external-device interface module receives the broadcasting content and additional information thereon from the broadcasting receiver 20, and transmits the broadcasting content that will be played to the broadcasting output device 30 by the content-playback module 270. The external-device interface module 270, while communicating with the broadcasting receiver 20 and the content-output device 30, may use security protocol such as high-bandwidth digital content protection (HDCP) or digital transmission content protection (DTCP) to prevent the broadcasting content from being illegally copied.

The meta-data management module 295 generates and manages metadata with respect to the broadcasting content recorded by the recorder module 285. In order to perform such operations, the meta-data management module 295 extracts content information with respect to the broadcasting content that is recorded by the recorder module 285 from the additional information obtained from the broadcasting receiver 20, and generates metadata that includes play history with respect to the extracted content information and the broadcasting content.

The meta-data management module 295 updates the metadata of the corresponding broadcasting content when the content-playback module 290 plays the broadcasting content. In this case, the play history information in the metadata may become most recent information by the update process. The metadata may include the content information or play history information. Here, the content information may include a variety of information such as a title, a genre, a channel (broadcasting station), air day, air date, and air time. Hereinafter, the content information will designate an individual property. Further, the play history information includes the number of times the broadcasting has been played, the most recently played date, the most recently played position that indicates how much of the broadcasting content has been played. The play history information may include other information that is not illustrated herein.

The preference-analysis module 250 sets a user preference with respect to each property of the broadcasting content recorded by the recorder module 285. In order to perform such an operation, the preference-analysis module 250 may use the play history of the metadata, e.g., the number of times the content has been played within a specific time frame, the total amount of time the content has been played. More particularly, if a TV program called "A" was recorded by a recorder module 285 and played twice, the preference-analysis module 250 sets each property of A, e.g., preferences toward the genre and the TV station to the fact that A was played twice. That is, if the genre of A and the station airing A respectively are "drama" and "terrestrial broadcasting", the preference-analysis module 250 sets the preference with respect to "drama" and "terrestrial broadcasting" in proportion to the number of times A has been played. The preference may be set according to the number of times the broadcasting content has been recorded. Here, the preference may have a scale of 1 to 5. For example, if the preference is 3, means the user has moderate interest. If the preference is above 3, the user has high interest in the broadcasting content, and if the preference is below 3, the user has low interest in the broadcasting content.

The storage module 240 stores preference information analyzed by the preference-analysis module 250. That is, the storage module 240 stores preference history information with respect to each property. Such storage module 240 may be implemented in at least one of a non-volatile memory device such as a cache, a Read Only Memory (RAM), a Programmable ROM (PROM), an Erasable Programmable ROM (EPROM), an Electrically Erasable Programmable ROM (EEPROM), and a flash memory or a volatile memory device such as a Random Access Memory (RAM), or a storage medium such as a hard disk drive (HDD), but is not limited thereto.

Once the user preference with respect to each property of the broadcasting content has been set by the preference-analysis module 250, the properties-list generation module 220 generates a list of properties based on the set preference information. In order to perform such an operation, the properties-list generation module 220 includes a property-extraction module 222, a properties-arrangement module 223, and a properties-clustering module 224.

Figure 3:
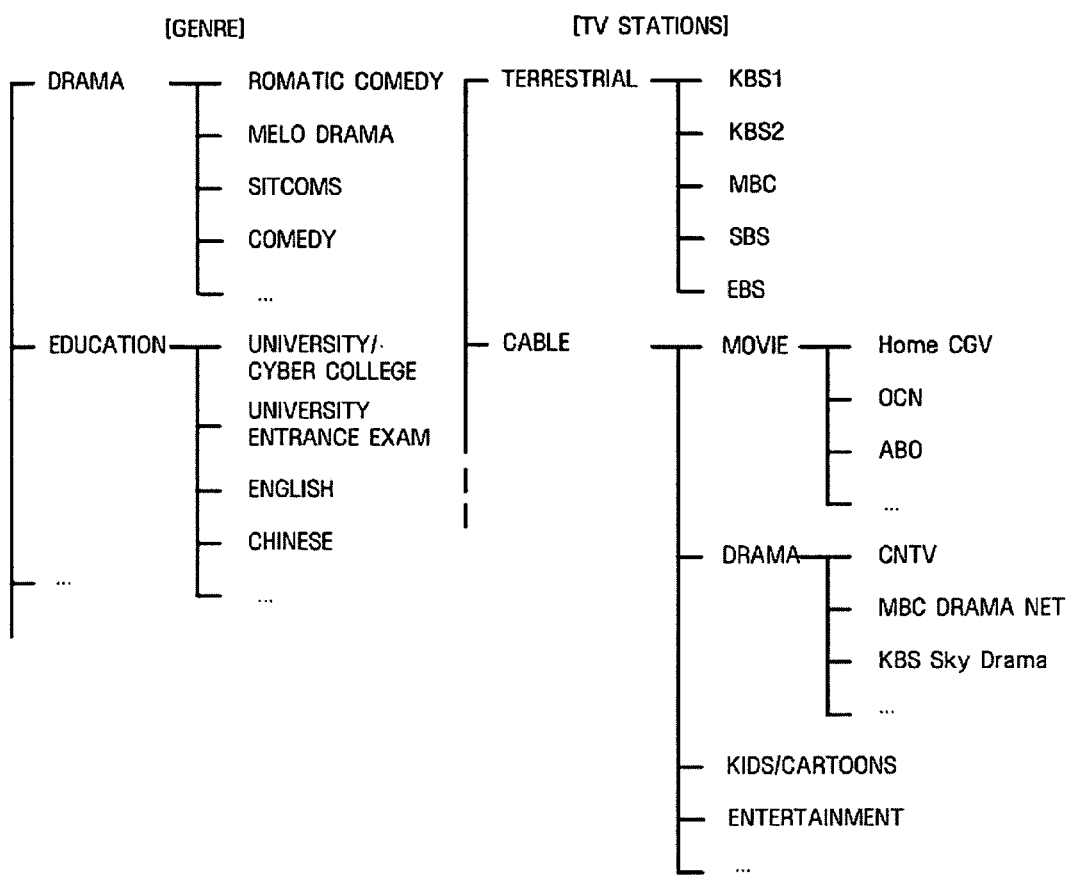
FIG. 3 hierarchically illustrates types of properties.

The properties-extraction module 222 extracts property information on the broadcasting content recorded by the recorder module 285. In this case, the property information has a hierarchical structure as illustrated in FIG. 3.

The properties-arrangement module 223 arranges the properties in accordance with the preference for each property. In this case, the properties-arrangement module 223 should put the most preferred property on the top.

The properties-clustering module 224 clusters each property arranged by the properties-arrangement module 223 according to the preference, and adds the corresponding group to a properties list. In this case, the properties-clustering module 224 should display detailed information on the group with respect to the corresponding property, as the preference is high.

In order to perform such an operation, the properties-clustering module 224 determines whether the preference for a specific property is greater than a predetermined threshold.

Once the determination has been made, if the preference for the specific property is greater than 3, the properties-clustering module 224 classifies the corresponding property as a group, and adds it to the properties list. In this case, information on the upper property of the corresponding property as well as information on the corresponding property should be displayed. For example, in the case of "INFANTS" in FIG. 4, since its preference is greater than 3, the properties-clustering module 224 classifies "INFANTS" as a group, and adds it to the properties list. In this case, it should be displayed as EDUCATION:INFANTS.

If the preference for a specific property is less than 3, the properties-clustering module 224 checks if the corresponding property has an upper property.

If the corresponding property has an upper property, the properties-clustering module 224 classifies the corresponding property as "OTHER" property, so as to be classified as a generic property, and adds it to the properties list. In this case, the properties list should display information on the other property of the upper property and the upper property. "GERMAN" in FIG. 4, for example, the user preference is 3 and its upper property is "EDUCATION". Therefore, the properties-clustering module 224 classifies "GERMAN" as "OTHER" genre with respect to "EDUCATION". This should be displayed as "EDUCATION (OTHER)" in the properties list.

If the upper property of the corresponding property does not exist, the properties-clustering module 224 classifies the corresponding property as "OTHER," so as to be classified as generic. "NEW" in FIG. 4, for example, the user preference is 3 and it does not have the upper property. Therefore, the properties clustering module 224 designates "NEWS" as "OTHER" with respect to the main genre.

Figure 5:
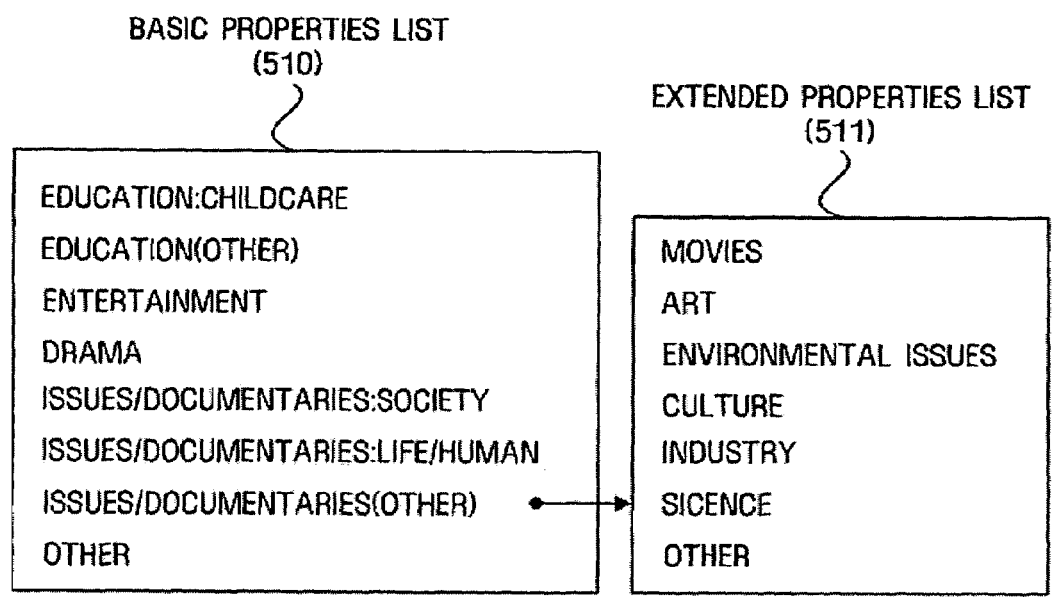
FIG. 5 illustrates a list of properties that have clustered according to a user preference according to an exemplary embodiment of the present invention.

As described above, the properties-list generation module 220 generates a properties list as illustrated in FIG. 5 based on results of the operations performed by the properties-extraction module 222, the properties-arrangement module, and the properties-clustering module 224. Referring to FIG. 5, the properties list can be classified into a main properties list, and an extended properties list. Here, the extended properties list is provided when OTHER is selected.

The program-list generation module 230 generates a filter having the property information selected by the user as a standard, and extracts a TV program that fits the filter condition from the programs that are currently aired or will soon be aired. Accordingly, the program-list generation module 230 generates a list of programs that will be recorded. In order to perform such an operation, the program-list generation module includes the filter-generation module 233 and filtering module 234.

The filter-generation module 233 generates a filter having the property selected by the user as a standard. In this case, the selection of the property may be performed in multiple steps. The filter-generation module 233 renews the filtering standard, i.e., the property selected from the list of previous properties list and the property selected from the list of current properties list.

The filtering module 234 extracts the broadcasting programs among currently aired programs and soon-to-be aired programs, which correspond to the filtering standard, and generates a list of the programs that will be recorded. In addition, the filtering module 234 dynamically renews the programs list when the filtering standard is dynamically renewed by the filter-generation module 233.

Figure 6:
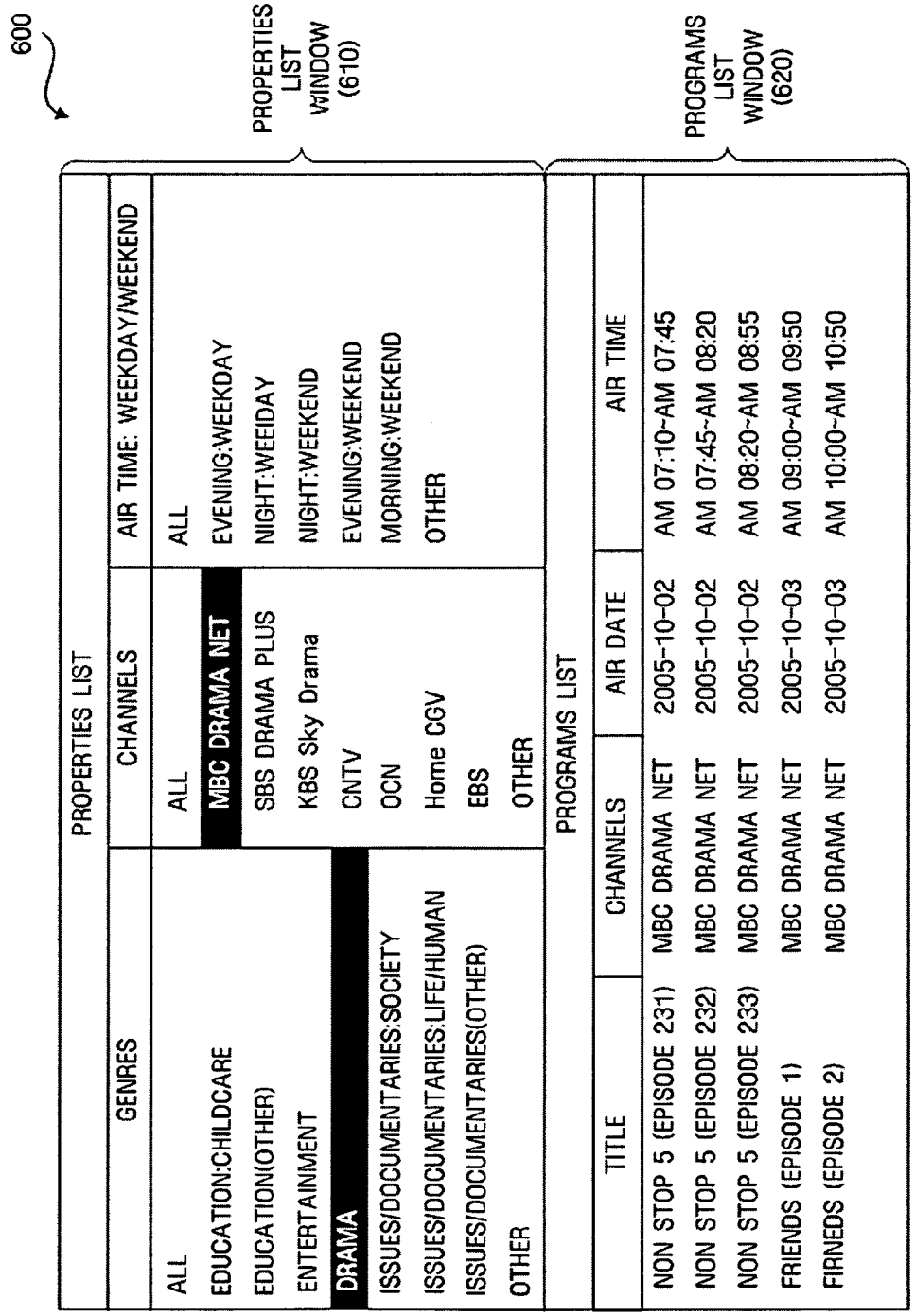
FIG. 6 illustrates a filtering interface provided by a filtering interface-providing device 200 according to an exemplary embodiment of the present invention.

A graphic user-interface module provides a filtering interface 600 that includes properties list generated by the properties-list generation module 220 and the programs list generated by the programs-list generation module 230. FIG. 6 illustrates the filtering interface provided by the filtering interface 200 600 according to an exemplary embodiment of the present invention.

A display module displays the result of the command process. For example, the display module visually displays the filtering module 600 as illustrated in FIG. 6.

The control module 260 controls operations of the module 210 or module 295, which compose the filtering interface-provision apparatus 200.

The term "module" described with reference to FIG. 2A means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, a filtering interface-provision method according to an exemplary embodiment of the present invention will be described in detail with reference to FIGS. 4 to 8.

Figure 7:
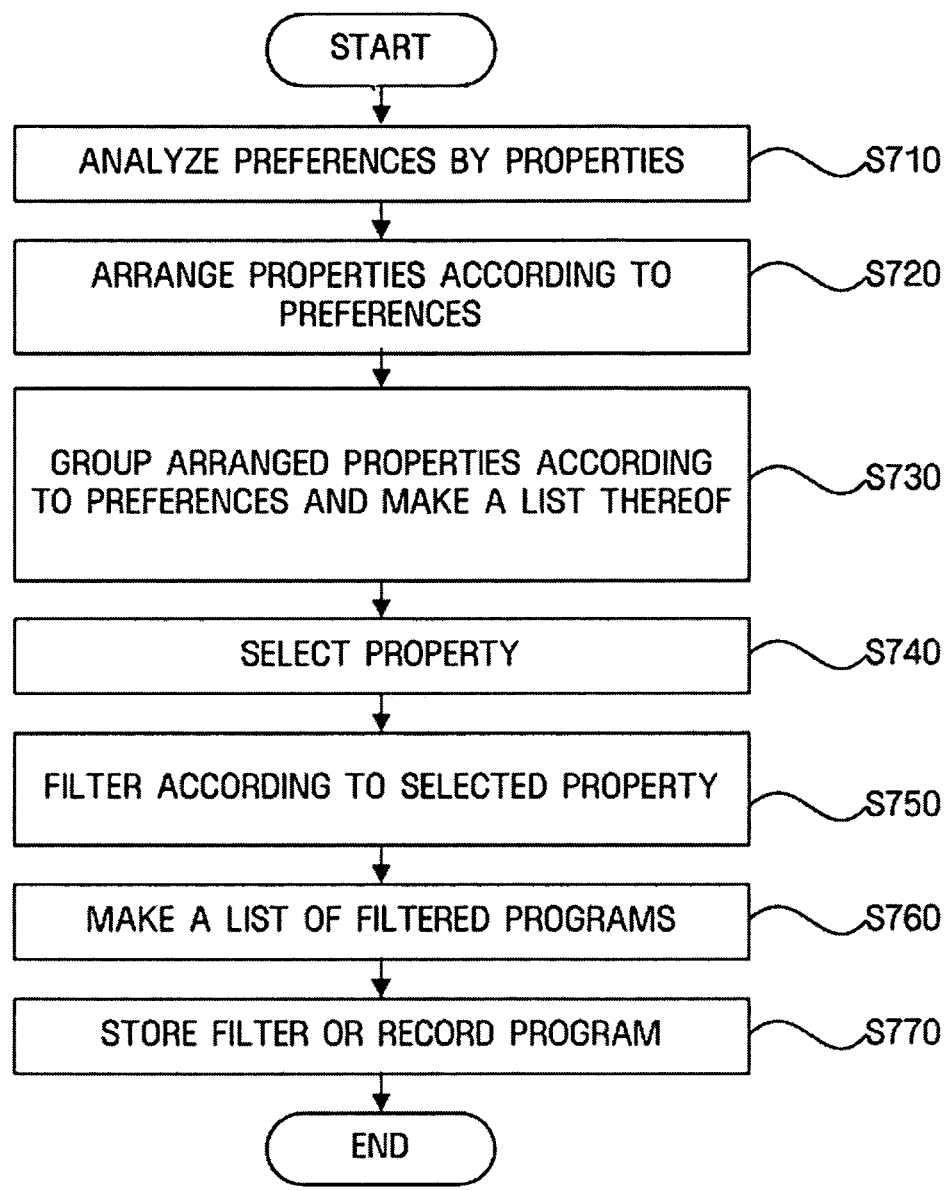
FIG. 7 is a flow chart illustrating a filtering interface according to an exemplary embodiment of the present invention.

FIG. 7 is a flow chart illustrating a filtering interface according to an exemplary embodiment of the present invention.

First, the preference-analysis module 250 analyzes preferences with respect to each property of the recorded programs S710. In order to set the preference for the property of the program, the preference-analysis module 250 may use the play history information of metadata. For example, using the play history information such as the number of times the content is played within a specific time frame, the total amount of time the content has been played, the preference with respect to the property may be set. The preference may have a value of 1 to 5.

Once the user preference for each property of the content has been set, the properties-list generation module 220 generates a list of customized properties based on the user preference information.

Once the property of the broadcasting content has been extracted by the properties-extraction module 222, the properties-arrangement module 223 arranges the properties according to the user preference S720. For example, the properties-arrangement module 223 puts the properties with the most preferred to the least preferred as illustrated in FIG. 4.

Once the properties have been arranged according to the preferences, the properties-clustering module 224 clusters the properties according to the user preferences, adds information on each group to the properties list, and generates the properties list S730. In this case, the properties-clustering module should display detailed information on the group including the corresponding property as the property is most preferred. Hereinafter, the detailed descriptions on the execution of clustering will be described more in detail with reference to FIG. 8.

Figure 8:
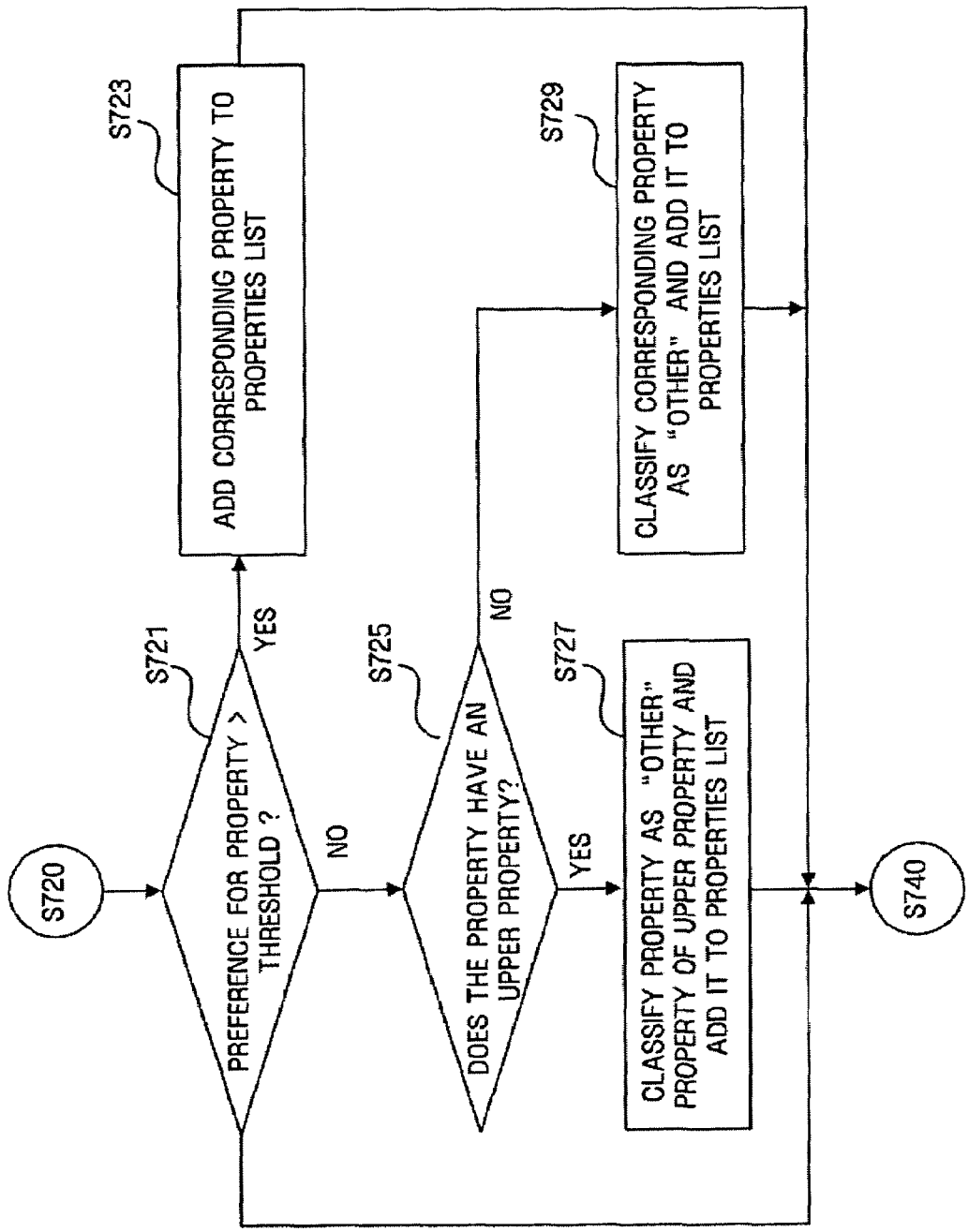
FIG. 8 is a flow chart illustrating the step S730 of FIG. 7, where the arranged properties cluster to generate a list.

FIG. 8 is a flow chart illustrating the step S730 of FIG. 7, where the arranged properties cluster to generate a list.

Referring to FIG. 8, once the properties have been arranged by the preferences, the properties-clustering module 224 determines whether the user preference is above the threshold, e.g. 3.

Once the determination has been made, if the preference for the specific property is greater than 3 (S721, YES), the properties-clustering module 224 designates the corresponding property as a group, and adds it to the properties list S723. In this case, information on the upper property of the corresponding property as well as information on the corresponding property should be displayed. For example, in the case of "INFANTS" in FIG. 4, since its preference is greater than 3, the properties-clustering module 224 designates "INFANTS" as a group, and adds it to the properties list. In this case, it should be displayed as EDUCATION:INFANTS.

If the preference for a specific property is less than 3 (S721, NO), the properties-clustering module 224 checks if the corresponding property has an upper property S725.

If the corresponding property has an upper property, the properties-clustering module 224 designates the corresponding property as "OTHER" property, and adds it to the properties list. In this case, the properties list should display information on other property of the upper property and the upper property. "GERMAN" in FIG. 4, for example, the user preference is 3 and its upper property is "EDUCATION". Therefore, the properties-clustering module 224 classifies "GERMAN" as "OTHER" genre with respect to "EDUCATION". This should be displayed as "EDUCATION (OTHER)" in the properties list.

If the corresponding property does not have an upper property (S725, NO), the properties-clustering module 224 classifies the corresponding property as "OTHER" S729. "NEWS" in FIG. 4, for example, the user preference is 3 and it does not have the upper property. The properties-clustering module 224 classifies "NEWS" as "OTHER", and adds it to the properties list. Accordingly, the corresponding property can be displayed as "OTHER" as illustrated in basic properties list of FIG. 5. In addition to "NEWS", "CULTURE/INFORMATION", "CARTOONS", "MOVIES", "INTERNATIONAL SATELITE", "INFOMERCIAL" and "HOBBIES/LEISURE" have a user preference of 3 or below without having an upper genre, and thus, are classified into "OTHER".

Once the property information has been clustered according to the user preference, the properties-list generation module 220 generates a customized property list based on the clustering result, i.e. "GENRE" in FIG. 5. The properties list generated by the properties-list generation module 220 is provided to the filtering interface-provision module 280.

Referring to FIG. 7, when a signal forming the filtering interface 600 is provided via user input, the graphic user-interface module forms the filtering interface including the properties list generated in the properties-list generation module 220. FIG. 6 illustrates a filtering interface 600 according to an exemplary embodiment of the present invention, and have properties list including "GENRES", "CHANNELS", AND "AIR TIME". In this case, the filtering interface 600 should include a programs-list window where the list of programs is displayed.

When the filtering interface 600 is displayed, the user may select the desired property via the user-input module 210 from the properties list S740.

Once the user's desired property has been selected, broadcasting program that corresponds to the selected property is extracted S750 by the programs-list generation module 230, and the programs list is generated S760.

More particularly, the filter-generation module 233 generates a filter that corresponds to the user-selected property. For example, when "DRAMA" is selected, the filter-generation module 233 generates a filter having "DRAMA" as a main genre.

Once the filter based on the user-selected properties is generated, the filtering module 234 extracts broadcasting content corresponding to the filter from currently aired or soon-to-be aired programs S750, and generates programs list S760. For example, if the filtering condition is "MAIN GENRE=DRAMA", the filtering module 234 extracts the broadcasting programs that correspond to DRAMA from the currently aired or soon-to-be aired programs, and generates the programs list. Information on the programs list is provided to a graphic user interface-provision module.

The filtering interface-provision module 280 displays the provided programs list via a programs-list window 620 of the filtering interface 600.

Once the programs list according to the selected properties has been provided, the user stores the filter or may set "RECORD" S770.

On the other hand, when a specific property is input in the properties list, one or more properties may be received. That is, one or more properties are displayed via the filtering interface 600. In this case, each property can be input in each property list.

Whenever properties are selected from each properties list, the filter-generation module 233 renews filtering conditions according to the selected properties in the current properties list. That is, the filter-generation module 233 generates a filter having the selected properties from the previous properties list and the current properties list as a filtering standard. For example, when GENRE is set to DRAMA, and CHANNELS is set to "MBC DRAMA NET", the filter-generation module 233 generates a filter having a standard where a genre is set to "DRAMA", and a channel is set to "MBC DRAMA NET".

The user can easily view programs that will be recorded according to the selected properties by displaying programs list along with the filtering interface 600, which corresponds to the selected properties in the clustered properties and each properties list according to the user preferences. In addition, the user can input a desired condition performing simple operations by providing the clustered properties list according to the user preferences.

As described above, according to a method and an apparatus for providing a filtering interface that searches for and records broadcasting content, the following effect(s) will be anticipated.

The present invention is advantageous in that a user can easily search for a desired broadcasting program not requiring multiple steps of manipulations when inputting search conditions.

The present invention is also advantageous in that a user can check a broadcasting program-to-be-recorded ahead of time by dynamically providing properties list that has been filtered according to user inputs.

The present invention is still advantageous in that it can provide a customized properties list for each user.

The exemplary embodiments of the present invention have been explained with reference to the accompanying drawings, but it will be apparent to those skilled in the art that various modifications and changes may be made thereto without departing from the scope and spirit of the invention. That is, a digital device that stores the broadcasting content has been described as an example of a filtering interface according to exemplary embodiments of the present invention. However, the filtering interface provision method may be applied when a menu is filtered according to user preferences and displayed in digital devices storing digital content such as computers, PDAs, PMPs, mobile phones, and digital broadcasting receivers. Therefore, it should be understood that the above exemplary embodiments are not restrictive but illustrative in all aspects.

What is claimed is:

1. A method for providing a filtering interface that records and searches for broadcasting content comprising:
    analyzing by a processor, user preferences for a plurality of properties of the broadcasting content according to play history information of the broadcasting content;
    generating a properties list by clustering at least one of the plurality of properties based on the user preferences, wherein the generating the properties list includes adding the at least one of the plurality of properties to the properties list when a user preference for the at least one of the plurality of properties is above a predetermined threshold;
    receiving a predetermined property from the properties list;
    generating a filter having the received property as a filtering standard;
    extracting broadcasting content that correspond to the filtering standard from currently-aired or soon-to-be-aired broadcasting content; and
    providing a list of the extracted broadcasting content;
    generating a new filter having the property selected from the list of previous properties list and the property selected from the list of current properties list as a new filtering standard by renewing the filtering standard when receiving a new property.

2. The method of claim 1, wherein the play history information includes at least one of information on a number of times the broadcasting content has been played and information on a total amount of time the broadcasting content has been played.

3. The method of claim 1, further comprising arranging the plurality of properties based on the user preferences.

4. The method of claim 1, wherein the adding the at least one of the plurality of properties to the properties list comprises displaying the at least one of the plurality of properties that is added to the properties list along with an upper property of the at least one of the plurality of properties.

5. The method of claim 1, wherein the generating the properties list comprises:
classifying the at least one of the plurality of the properties as "OTHER" property of an upper property if the user preference for the at least one of the plurality of the properties is below the predetermined threshold and the at least one of the plurality of the properties has the upper property; and
adding the "OTHER" property to the properties list.

6. The method of claim 5, wherein the adding of the "OTHER" property to the properties list comprises:
displaying a property included in the "OTHER" property if "OTHER" property of the upper property is selected by the user.

7. The method of claim 1, wherein the generating the properties list comprises:
classifying at least one of the plurality of the properties as "OTHER" property if the user preference for the at least one of the plurality of the properties is below a threshold and the at least one of the plurality of the properties does not have an upper property; and
adding the "OTHER" property to the properties list.

8. The method of claim 7, wherein the adding the "OTHER" property to the properties list comprises:
displaying a property including the classified "OTHER" property if the "OTHER" property is selected by the user.

9. The method of claim 1, further comprising providing a filtering interface that includes the properties list and the list of the extracted broadcasting content.

10. The method of claim 1, wherein the generating the properties list comprises:
collectively classifying at least two of the plurality of the properties into a generic property if the user preferences for the at least two of the plurality of the properties are below the predetermined threshold;
adding the generic property to the properties list;
individually classifying others of the plurality of the properties into respective individual classified properties if the user preferences for the others of the plurality of properties are greater than the predetermined threshold; and
adding the individual classified properties to the properties list;
wherein the method further comprises displaying the properties list, the displaying the properties list comprising displaying the individual classified properties and the generic property, the generic property being displayed instead of the at least two of the plurality of the properties.

11. The method of claim 1 further comprising displaying the properties list,
wherein the plurality of properties comprises a first property, a second property, a third property and a fourth property,
the first and the second properties have respective user preferences below the predetermined threshold,
the third and the fourth properties have user preferences above the predetermined threshold, and
the generating the properties list comprises classifying the first and the second properties into a generic property and respectively classifying the third and the fourth properties into their own properties,
the displaying the properties list comprises displaying the third property, the fourth property, and the generic property, the generic property being displayed instead of the first and the second properties.

12. An apparatus for providing a filtering interface that records and searches for broadcasting content comprising:
a processor;
a preference-analysis module that analyzes under a control of the processor, user preferences for a plurality of properties of the broadcasting content according to play history information of the broadcasting content;
a properties-list generation module that generates a properties list by clustering the at least one of the plurality of properties based on the user preferences, wherein the properties-list generation module comprises a properties-clustering module that adds the at least one of the plurality of properties to the properties list when a user preference for the at least one of the plurality of properties is above a predetermined threshold;
a user-input module that receives a predetermined property from the properties list;
a filter-generation module that generates a filter having the received property as a filtering standard;
a filtering module that extracts broadcasting content that correspond to the filtering standard from currently-aired or soon-to-be-aired broadcasting content; and
a filtering-interface module that provides a list of the extracted broadcasting content, wherein the filter-generation module generates a new filter having the property selected from the list of previous properties list and the property selected from the list of current properties list as a new filtering standard by renewing the filtering standard when receiving a new property.

13. The apparatus of claim 12, wherein the play history information includes at least one of information on a number of times the recorded broadcasting content has been played, and information on a total amount of time the broadcasting content has been played.

14. The apparatus of claim 12, further comprising a properties-arrangement module that arranges the plurality of properties based on the user preferences.

15. The apparatus of claim 12, wherein the properties-clustering module displays the at least one of the plurality of properties that is added to the properties list along with an upper property of the at least one of the plurality of properties.

16. The apparatus of claim 12, wherein the properties-list generation module classifies the at least one of the plurality of properties as "OTHER" property of an upper property if the user preference for the at least one of the plurality of properties is below the predetermined threshold and the at least one of the plurality of properties has the upper property; and adds the "OTHER" property to the properties list.

17. The apparatus of claim 16, wherein the properties-clustering module provides a property included in the "OTHER" property of the upper property if the "OTHER" property of the upper property is selected by the user.

18. The apparatus of claim 12, wherein the properties-list generation module classifies the at least one of the plurality of properties as "OTHER" property if the user preference for the at least one of the plurality of properties is below a threshold and the at least one of the plurality of properties does not have an upper property; and includes a properties-clustering module that adds the "OTHER" property to the properties list.

19. The apparatus of claim 18, wherein the properties-clustering module provides property information included in the "OTHER" property if the "OTHER" property is selected by the user.

20. The apparatus of claim 12, wherein the filtering interface-provision module provides a filtering interface that includes the properties list and the list of the extracted broadcasting content.

* * * * *